United States Patent [19]
Seki

[11] Patent Number: 6,064,248
[45] Date of Patent: May 16, 2000

[54] CLOCK PULSE TRANSMISSION CIRCUIT

[75] Inventor: Nobusuke Seki, Tatebayashi, Japan

[73] Assignee: Advantest Corporation, Tokyo, Japan

[21] Appl. No.: 09/074,445

[22] Filed: May 7, 1998

[30] Foreign Application Priority Data

May 9, 1997 [JP] Japan ................................... 9-119319

[51] Int. Cl.[7] ...................................................... G06F 1/04
[52] U.S. Cl. .......................... 327/296; 327/175; 327/170; 327/171
[58] Field of Search .................................. 327/291, 295, 327/296, 172–175, 171, 170; 359/154, 158, 186; 375/238, 318, 358

[56] References Cited

U.S. PATENT DOCUMENTS

| 4,694,504 | 9/1987 | Porter et al. | ............................. | 359/194 |
| 4,713,841 | 12/1987 | Porter et al. | ............................. | 359/194 |

*Primary Examiner*—Toan Tran
*Assistant Examiner*—Minh Nguyen
*Attorney, Agent, or Firm*—Gallagher & Lathrop; David N. Lathrop; Timothy J. Lane

[57] ABSTRACT

A clock pulse transmission circuit is provided which can automatically correct, in case the duty factor of transmitted clock pulses has an error, the duty factor error. In a receiving unit 2, a pair of positive and negative clock pulses Sp and Sn transmitted from a transmitting unit 1 are inputted to a receiver 12 which outputs, in response thereto, a pair of positive and negative clock pulses V3 and V4. The DC components of these positive and negative clock pulses are taken out by a first integrator circuit and a second integrator circuit respectively to transmit them to the transmitting unit 1 through a pair of transmission lines 25 and 26, respectively. In the transmitting unit 1, a difference between the direct current levels of the respective positive and negative clock pulses is found and integrated. The integrated value is supplied to a driver 6 as a threshold voltage Vth. The driver 6 compares an output signal of a time constant circuit 20 with the threshold voltage to output a pair of positive and negative clock pulses Sp and Sn and transmits them to the receiving unit 2.

9 Claims, 8 Drawing Sheets

CLOCK PULSE TRANSMISSION CIRCUIT

BACKGROUND OF THE INVENTION

1. Field of the Invention

The present invention relates to a clock pulse transmission circuit which is suitable for use in carrying (transmitting and receiving) clock pulses having a constant duty factor between two units (apparatus or circuits) connected with each other by a transmission path such as, for example, a cable. More particularly, the present invention relates to a clock pulse transmission circuit which is capable of automatically correcting a change in the duty factor of the clock pulses, even if the duty factor is changed in the case where the clock pulses are transmitted between two units located apart from each other.

2. Description of the Related Art

Many of the semiconductor device testing apparatus (commonly called IC tester) for testing various types of semiconductor devices such as, for example, a semiconductor integrated circuit (IC) have a semiconductor device transporting and handling apparatus (hereinafter referred to as handler) connected thereto for transporting a semiconductor device to be tested or under test (commonly called DUT) to a testing or test section, followed by carrying the tested semiconductor device out of the test section and transporting it to a predetermined location. In a semiconductor device testing apparatus (hereinafter referred to as IC tester) of such type, a portion thereof called a test head which is disposed in the test section of the handler is formed separately from the IC tester proper, and the test head is connected to the IC tester proper by a signal transmission path such as, for example, a cable.

When clock pulses having a constant duty factor are transmitted as a pair of clock pulses comprising a clock signal having positive pulses (hereinafter referred to as positive clock pulses) and a clock signal having negative pulses (hereinafter referred to as negative clock pulses), there occurs a change in the duty factor between a transmitting circuit and a receiving circuit due to unbalances between signal transmission length of the positive clock pulses and signal transmission length of the negative clock pulses as well as an amount of transmission loss of the positive clock pulses and an amount of transmission loss of the negative clock pulses, or due to differences in the transmitting and receiving circuits between a delay time caused when a clock pulse is changed from high level to low level and a delay time caused when a clock pulse is changed from low level to high level. Since this displacement of the duty factor sometimes becomes a cause for eventually degrading a timing accuracy of the IC tester, it is required to correct the displacement of the duty factor.

Figure 8:
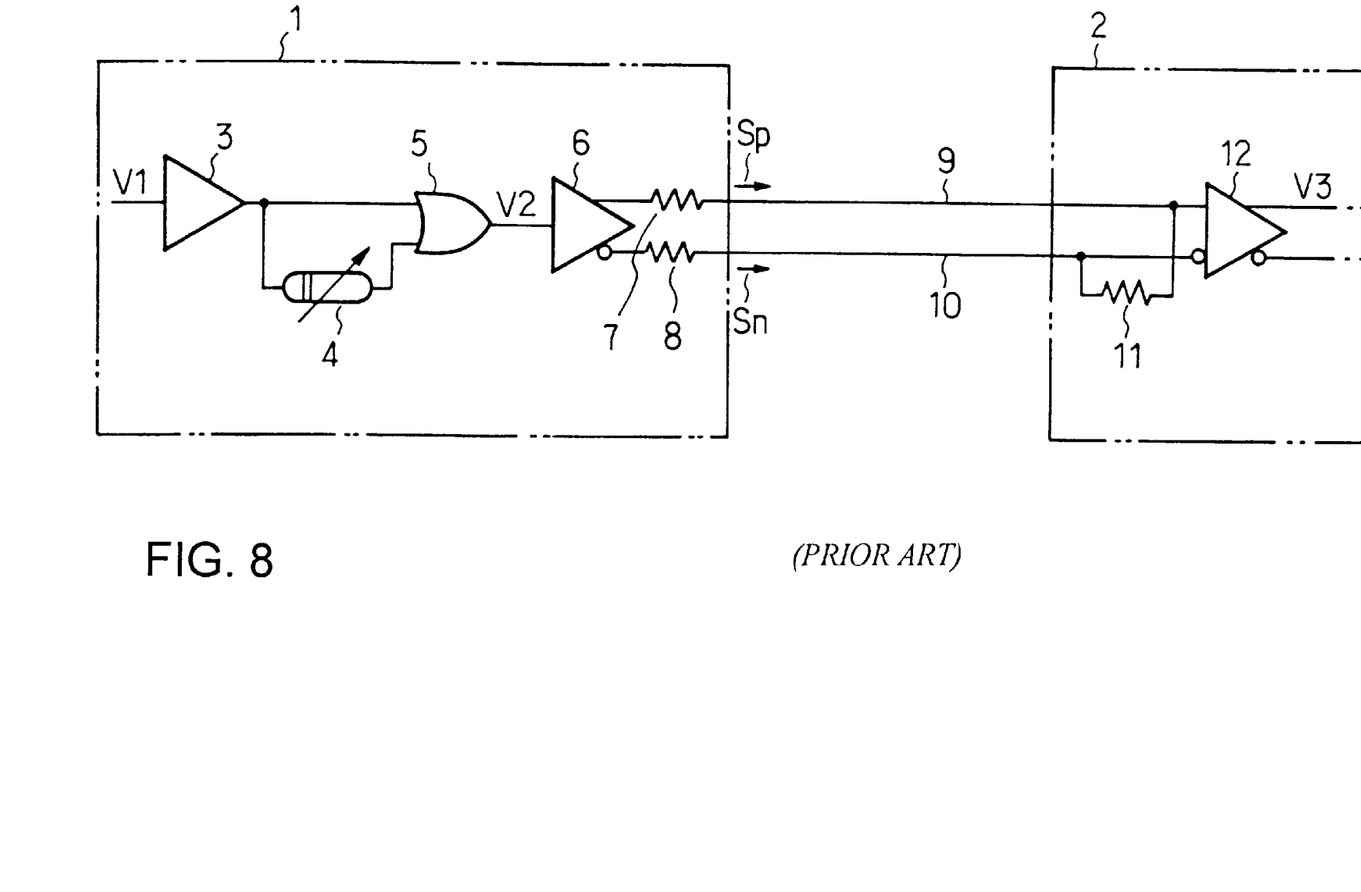
FIG. 8 is a circuit connection diagram showing an example of a conventional clock pulse transmission circuit.

When clock pulses are transmitted at high speed with high accuracy between two units located apart from each other in an IC tester, there is generally used a differential transmission system wherein an emitter-coupled logic (hereinafter referred to as an ECL) is used. FIG. 8 shows an example of a conventional clock pulse transmission circuit of the differential transmission system using the ECL.

The clock pulse transmission circuit exemplarily shown comprises a transmitting unit (transmitting circuit) 1, a receiving unit (receiving circuit) 2, two transmission lines 9 and 10 for interconnecting those units 1 and 2. The transmitting unit 1 comprises a buffer 3 to which input pulses are supplied, a variable delay circuit 4 to which output pulses of the buffer 3 are supplied, a logic gate (OR gate) 5 to which output pulses of the variable delay circuit 4 and output pulses of the buffer 3 are supplied, and a driver 6 to which output pulses of the logic gate 5 are supplied.

The driver 6 comprises an ECL differential buffer and outputs a pair of positive clock pulses Sp and negative clock pulses Sn in response to the output pulses of the logic gate 5. Further, resistors 7 and 8 are serially inserted, respectively, into input terminals of the transmission lines 9 and 10 for transmitting the pair of clock pulses Sp and Sn outputted from the driver 6 to the receiving unit 2.

On the other hand, the receiving unit 2 includes a receiver 12 comprising an ECL differential buffer. Further, a termination resistor 11 is connected between termination terminals of the transmission lines 9 and 10.

In the conventional clock pulse transmission circuit constructed as described above, the displacement of the duty factor of the transmitted clock pulses is corrected such that the displacement of the duty factor of the clock pulses transmitted to the receiving unit 2 is detected by observing with an oscilloscope the positive and negative clock pulses (or either of the positive or negative clock pulses) outputted from the receiver 12 in the receiving unit 2, or by inputting the clock pulses to a comparator circuit to compare the clock pulses with reference clock pulses, and then the amount of delay of the variable delay circuit 4 in the transmitting unit 1 is adjusted in accordance with the magnitude of the detected displacement.

Figure 9A:
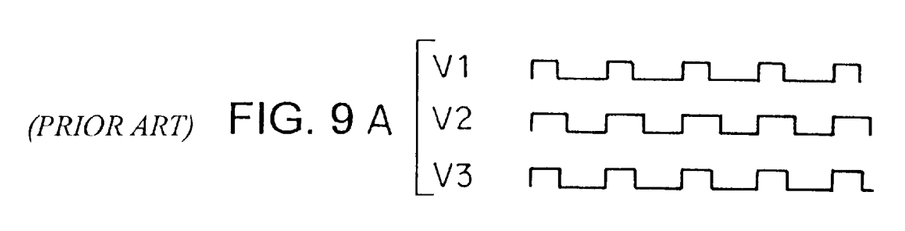
FIGS. 9A and 9B are waveform diagrams for explaining the operation of the conventional clock pulse transmission circuit shown in FIG. 8.
Figure 9B:
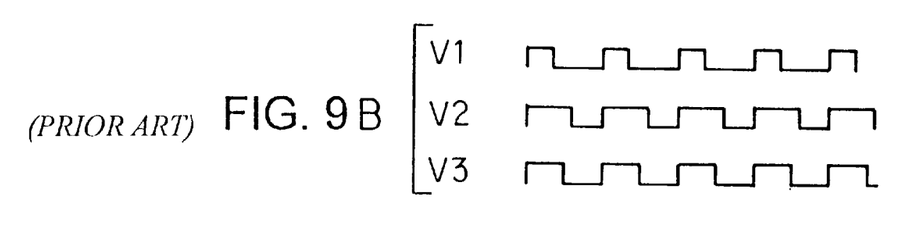

For example, it is assumed that when a set value of the variable delay circuit 4 of the transmitting unit 1 is set to a middle value, and positive clock pulses having a 50% duty factor (refer to a waveform V2 in FIG. 9A) are generated through the logic gate 5 from positive clock pulses having a duty factor which is considerably smaller than 50% (refer to a waveform V1 in FIG. 9A), and then the positive clock pulses are inputted to the driver 6 to transmit positive and negative clock pulses Sp and Sn each having a 50% duty factor to the receiving unit 2 via the transmission lines 9 and 10, the duty factor of the positive clock pulses outputted from the receiver 12 in the receiving unit 2 has become smaller than 50% as shown in a waveformn V3 in FIG. 9A. In this case, the duty factor of the positive clock pulses outputted from the receiver 12 in the receiving unit 2 is adjusted to become 50% as shown in a waveform V3 in FIG. 9B such that the amount of delay of the variable delay circuit 4 in the transmitting unit 1 is set to large value to enlarge the pulse widths of the output pulses from the logic gate 5 as shown in a waveform V2 in FIG. 9B. Further, a waveform V1 in FIG. 9B is same as the waveform V1 in FIG. 9A.

However, in such an adjusting method, the displacement of the duty factor of the clock pulses received by the receiver 12 must be detected by observing with an oscilloscope the displacement of the duty factor or by inputting the clock pulses to a comparator circuit to compare the clock pulses with reference clock pulses, and thereafter the amount of delay of the variable delay circuit 4 in the transmitting unit 1 must be adjusted so that the detected displacement becomes zero. Therefore, there are problems that many operation steps are required in the adjustment work, and the adjustment work is complex and time consuming.

Moreover, due to an aged deterioration of the variable delay circuit 4 and other circuits in the transmitting unit, there is a problem that the amount of delay for setting the duty factor of the clock pulses (a set value of the variable delay circuit 4) is changed and the re-adjustment thereof is required.

It is needless to say that the above problems similarly occur not only in an IC tester but also in various instances for transmitting clock pulses between two units (apparatus or circuits) at high speed with high accuracy.

SUMMARY OF THE INVENTION

It is an object of the present invention to provide a clock pulse transmission circuit which can automatically correct, when a duty cycle of clock pulses transmitted from a transmitting side to a receiving side is displaced, the displacement.

In a first aspect of the present invention, in order to achieve the above object, there is provided a clock pulse transmission circuit including a transmitting unit for outputting a pair of positive and negative clock pulses to transmit them, a receiving unit for receiving said clock pulses transmitted from said transmitting unit and outputting a pair of positive and negative clock pulses, and signal transmission paths for connecting between said transmitting unit and said receiving unit, and wherein said receiving unit comprises: receiver means for outputting a pair of positive and negative clock pulses in response to clock pulses transmitted from said transmitting unit through said signal transmission paths and supplied to input terminals of said receiver means; first and second filter means for taking out direct current (DC) components of the positive and negative clock pulses outputted from said receiver means, respectively; and a first buffer circuit and a second buffer circuit for transmitting respective output signals of said first and second filter means to said transmitting unit through a pair of control signal transmission paths; and wherein said transmitting unit comprises: a time constant circuit for giving a slope to the leading edge and the trailing edge of each of the clock pulses; a driver for comparing an output signal of said time constant circuit with a threshold signal having a predetermined voltage value and outputting a pair of positive and negative clock pulses corresponding to a difference between the both signals and transmitting them to said receiving unit; differential amplifier means for finding a difference between output signals respectively transmitted from said first and second buffer circuits in said receiving unit to detect an error in duty factor of said pair of positive and negative clock pulses outputted from said receiver means in said receiving unit; and integrator means for integrating an output signal of said differential amplifier means to supply an integrated value to said driver as a threshold voltage.

In a first preferred embodiment, the driver in the transmitting unit comprises a differential buffer and generates the positive and negative clock pulses when an output signal of the time constant circuit is supplied to one input terminal of the driver and an output signal of the integrator means is supplied as a threshold voltage to the other input terminal of the driver; the receiver means in the receiving unit also comprises a differential buffer and outputs the pair of positive and negative clock pulses when the positive and negative clock pulses transmitted from the driver in the transmitting unit are supplied to two input terminals of the receiver means; and the first and second filter means in the receiving unit are a first integrator circuit and a second integrator circuit for integrating the positive and negative clock pulses respectively to detect mean voltage values of their respective direct current levels.

In addition, a third buffer circuit and a fourth buffer circuit are inserted respectively between two input terminals of the differential amplifier means in the transmitting unit and the pair of control signal transmission lines, and a fifth buffer circuit is inserted between the integrator means and the driver in the transmitting unit.

Further, each of the driver in the transmitting unit and the receiver means in the receiving unit comprises a differential buffer using an emitter-coupled logic.

In a second aspect of the present invention, in order to attain the above object, there is provided a clock pulse transmission circuit a transmitting unit for outputting a pair of positive and negative clock pulses to transmit them, a receiving unit for receiving said clock pulses transmitted from said transmitting unit and outputting a pair of positive and negative clock pulses, and signal transmission paths for connecting between said transmitting unit and said receiving unit, and wherein said receiving unit comprises: receiver means for outputting positive or negative clock pulses in response to the clock pulses transmitted from said transmitting unit through said signal transmission paths and supplied to input terminals of said receiver means; a time constant circuit for giving a slope to the leading edge and the trailing edge of each of the clock pulses outputted from said receiver means; a differential buffer for comparing an output signal of said time constant circuit with a threshold signal having a predetermined voltage value to output a pair of positive and negative clock pulses corresponding to a difference between the both signals; first and second filter means for taking out direct current (DC) components of said positive and negative clock pulses outputted from said differential buffer, respectively; differential amplifier means for finding a difference between the signals respectively outputted from said first and second filter means to detect an error in duty factor of said pair of positive and negative clock pulses outputted from said differential buffer; and integrator means for integrating an output signal of said differential amplifier means to supply an integrated value to said differential buffer as a threshold voltage; and wherein said transmitting unit comprises: a driver for outputting a pair of positive and negative clock pulses in response to clock pulses supplied to its input terminal.

In a preferred second embodiment, a first buffer circuit and a second buffer circuit are inserted respectively between the first and second filter means and two input terminals of the differential amplifier means in the receiving unit, and a third buffer circuit is inserted between the integrator means and the differential buffer.

Further, each of the driver in the transmitting unit, the receiver means and the differential buffer in the receiving unit comprises a differential buffer using an emitter-coupled logic.

DETAILED DESCRIPTION OF THE PREFERRED EMBODIMENTS

Several embodiments of the clock pulse transmission circuit according to the present invention will be explained below in detail with reference to FIGS. 1–7.

Figure 1:
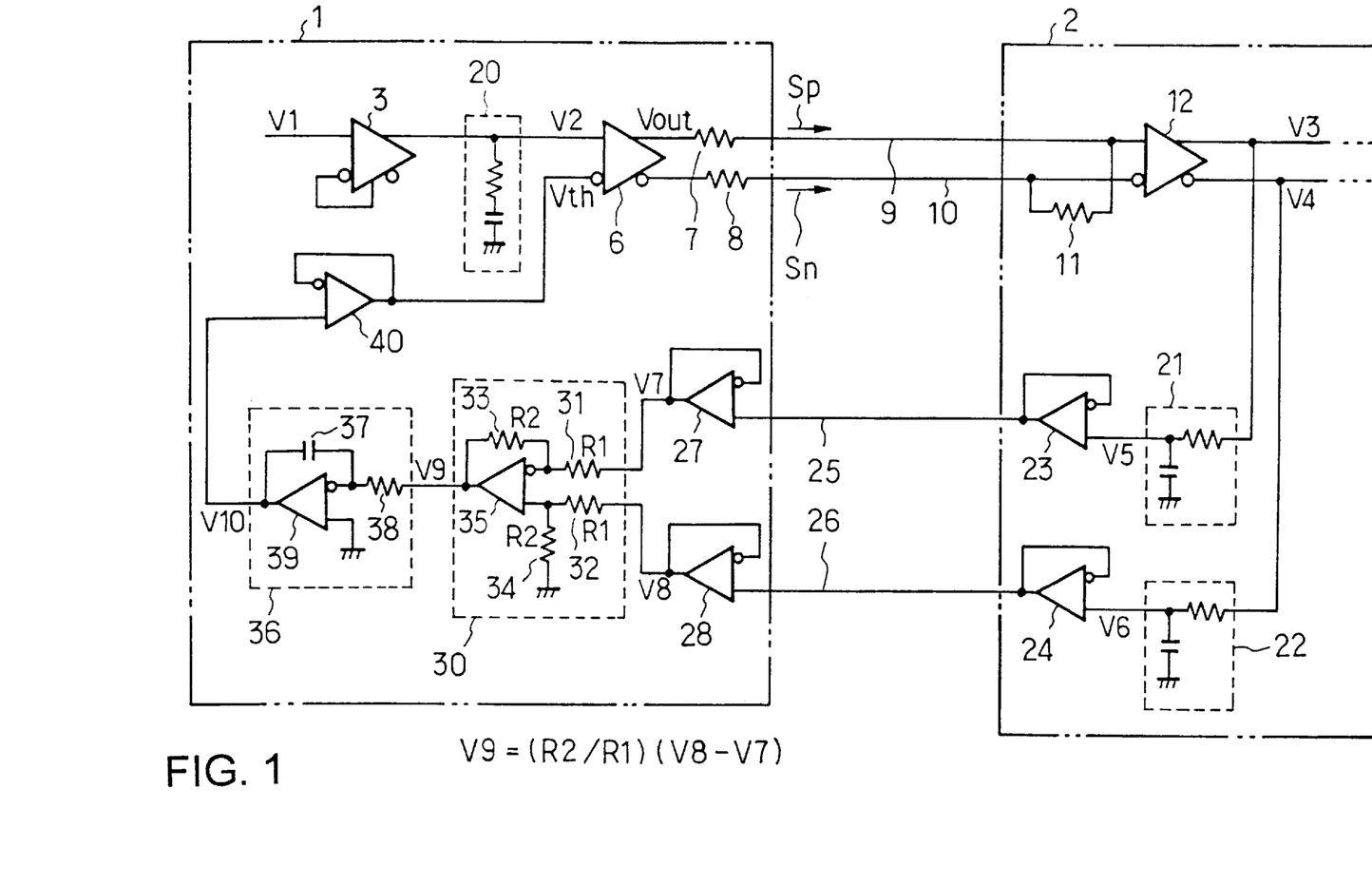
FIG. 1 is a circuit connection diagram showing a first embodiment of a clock pulse transmission circuit according to the present invention.

FIG. 1 is a circuit connection diagram showing a first embodiment of the clock pulse transmission circuit according to the present invention. Further, in order to simplify the explanation, portions or elements in FIG. 1 corresponding to those in FIG. 8 have the same reference characters affixed thereto as those in FIG. 8 and the explanation thereof will be omitted unless it is necessary.

The clock pulse transmission circuit in this embodiment comprises a transmitting unit (transmitting circuit) 1, a receiving unit (receiving circuit) 2, two clock pulse transmission lines 9 and 10 for transmitting a pair of positive clock pulses Sp and negative clock pulses Sn from the transmitting unit 1 to the receiving unit 2 and two control signal transmission lines 25 and 26 for transmitting control signals from the receiving unit 2 to the transmitting unit 1.

The transmitting unit 1 comprises a first buffer 3 to which input pulses are supplied, a driver 6 to which output pulses of the buffer 3 are supplied via a time constant circuit 20, a second buffer 27 and a third buffer 28 to which the control signals are transmitted respectively from the receiving unit 2 via the control signal transmission lines 25 and 26, a differential amplifier 30 for differentially amplifies output signals of those buffers 27 and 28, an integrator 36 for integrating an output signal of the differential amplifier 30 and a fourth buffer 40 to which an output signal of the integrator is inputted.

Although the first buffer 3 to which input pulses are supplied comprises, in this example, an ECL differential buffer, the first buffer 3 is used as a single output buffer wherein only non-inverting input/output terminals are made usable. The time constant circuit 20 is an RC time constant circuit comprising a series circuit of a resistor and a capacitor, and is connected between an output terminal of the first buffer 3 and a common electric potential point (ground). The second-fourth buffers 27, 28 and 40 are analog buffers and any one of those buffers has its inverting input terminal connected to its output terminal, and hence an input signal is inputted to its non-inverting input terminal.

The driver 6 comprises an ECL differential buffer. A pulse signal to which a predetermined time constant is given by the time constant circuit 20 is supplied to a non-inverting terminal of the driver 6 and an output signal of the fourth buffer 40 is supplied to an inverting terminal of the driver 6 as a threshold voltage (to be explained later). This driver 6 outputs a pair of positive clock pulses Sp and negative clock pulses Sn in response to those input signals. Further, resistors 7 and 8 are inserted respectively in series into input terminals of the transmission lines 9 and 10 for transmitting the pair of clock pulses Sp and Sn outputted from the driver 6 to the receiving unit 2.

The differential amplifier 30 includes an operational amplifier 35. An output signal of the second buffer 27 is supplied to an inverting input terminal of the differential amplifier 30 via a resistor 31 and an output signal of the third buffer 28 is supplied to a non-inverting input terminal of the differential amplifier 30 via a resistor 32. In addition, a resistor 33 is connected between the output terminal and the inverting input terminal of the differential amplifier 30 and a resistor 34 is connected between the non-inverting input terminal of the differential amplifier 30 and the ground. The differential amplifier 30 constructed as explained above functions as an error detection circuit. When the voltage of an output signal of the second buffer 27 is V7, the voltage of an output signal of the third buffer 28 is V8, each of the resistance values of the resistors 31 and 32 is R1, and each of the resistance values of the resistors 33 and 34 is R2, the voltage V9 appearing at the output terminal is, as well known in this technical field, $V9=(R2/R1)(V8-V7)$.

The integrator 36 includes an operational amplifier 39. An output signal of the differential amplifier 30 is supplied to an inverting input terminal of the integrator 36 and a non-inverting input terminal of the integrator 36 is connected to the ground. In addition, a capacitor 37 is connected between the output terminal and the inverting input terminal of the integrator 36, and the output terminal of the integrator 36 is connected to a non-inverting input terminal of the fourth buffer 40.

On the other hand, the receiving unit 2 includes a receiver 12 comprising an ECL differential buffer, a first integrator circuit 21 for integrating an output signal (positive clock pulses) from a non-inverting output terminal of the receiver 12, a fifth buffer 23 to which an output signal of the first integrator circuit 21 is supplied, a second integrator circuit 22 for integrating an output signal (negative clock pulses) from an inverting output terminal of the receiver 12 and a sixth buffer 24 to which an output signal of the second integrator circuit 22 is supplied. Further, a termination resistor 11 is connected between termination terminals of the pair of transmission lines 9 and 10 for transmitting clock pulses.

Each of the first and second integrator circuits 21 and 22 is an RC integrator circuit wherein a resistor is serially inserted in the signal path and a capacitor is connected between the signal path and the ground, and functions as a low pass filter. Each of the fifth and sixth buffers 23 and 24 is an analog buffer wherein the inverting input terminal is connected to the output terminal, and hence integrated outputs from the integrator circuits 21 and 22 are supplied to non-inverting input terminals of those buffers 23 and 24, respectively.

The transmission line 9 for transmitting positive clock pulses Sp is connected to a non-inverting input terminal of the receiver 12' and the transmission line 10 for transmitting negative clock pulses Sn is connected to an inverting input terminal of the receiver 12. The clock pulses outputted respectively from the non-inverting and inverting output terminals of the receiver 12 are supplied to a next stage circuit, and are supplied, as mentioned above, to the non-inverting input terminals of the fifth and sixth buffers 23 and 24 via the first and second integrator circuits 21 and 22, respectively.

An output terminal of the fifth buffer 23 is connected to one transmission line 25 for transmitting control signals and an output terminal of the sixth buffer 24 is connected to the other transmission line 26 for transmitting control signals. Therefore, one group of the control signals (to be explained later in detail) is supplied from the fifth buffer 23 to the second buffer 27 in the transmitting unit 1 via the one transmission line 25, and the other group of the control signals is supplied from the sixth buffer 24 to the third buffer 28 in the transmitting unit 1 via the other transmission line 26.

Figure 2A:
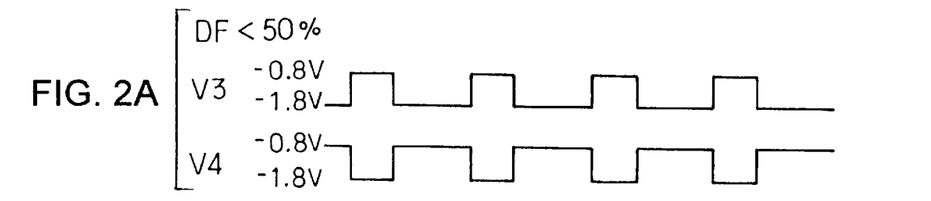
FIGS. 2A, 2B and 2C are waveform diagrams of output pulses V3 and V4 of a receiving unit of the clock pulse transmission circuit shown in FIG. 1.
Figure 2B:
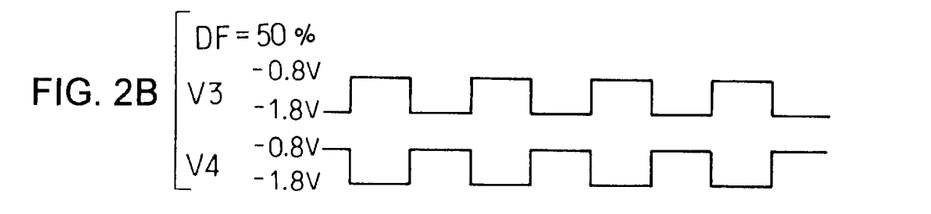
Figure 2C:
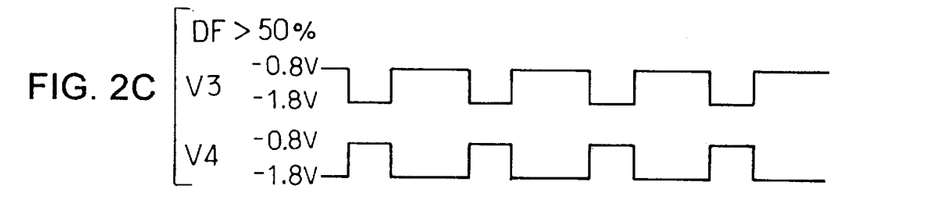

In this embodiment, a high level voltage is set to approximately −0.8V and low level voltage is set to approximately −1.8V in the ECL differential buffer. Therefore, each direct current level (a mean value) of the positive clock pulses V3 and the negative clock pulses V4 outputted from the receiver 12 comprising an ECL differential buffer changes, as can easily be understood from the waveforms shown in FIG. 2, in accordance with the value of duty factor DF.

FIG. 2A shows an example of each of the waveform V3 of positive clock pulses and the waveform V4 of negative clock pulses outputted from the receiver 12 when the duty factor DF is smaller than a standard value 50%. In this case, the direct current level (mean value) of the waveform V3 is naturally smaller than the direct current level (mean value) of the waveform V4. That is, direct current level of the waveform V3<direct current level of the waveform V4 (1).

FIG. 2B shows an example of each of the waveform V3 of positive clock pulses and the waveform V4 of negative clock pulses outputted from the receiver 12 when the duty factor DF is equal to the standard value 50%. In this case, the direct current level (mean value=−1.3V) of the waveform V3 is naturally equal to the direct current level (mean value=−1.3V) of the waveform V4. That is, direct current level of the waveform V3=direct current level of the waveform V4 (2).

FIG. 2C shows an example of each of the waveform V3 of positive clock pulses and the waveform V4 of negative clock pulses outputted from the receiver 12 when the duty factor DF is larger than the standard value 50%. In this case, the direct current level (mean value) of the waveform V3 is naturally larger than the direct current level (mean value) of the waveform V4. That is, direct current level of the waveform V3=direct current level of the waveform V4 (3).

From the above facts, it can be understood that an error of duty actor DF can be detected by comparing the direct current level of the waveform V3 with the direct current level of the waveform V4.

The present invention is invented by paying attention to the above point. As mentioned above, the clock pulse transmission circuit according to the present invention is constructed such that the first and second integrator circuit 21 and 22 are provided in the receiving unit 2, positive clock pulses outputted from the non-inverting output terminal of the receiver 12 and negative clock pulses outputted from the inverting terminal of the receiver 12 are integrated by those integrator circuits 21 and 22 respectively, and the direct current level (mean value) of the waveform V3 of positive clock pulses and the direct current level (mean value) of the waveform V4 of negative clock pulses are obtained.

In the present invention, first, in the transmitting unit 1, the aforementioned RC time constant circuit 20 is inserted between the first buffer 3 and the driver 6, and after each of the input clock pulses is converted to a trapezoidal wave by giving an inclination to the leading edge and the trailing edge of the input clock pulse by the RC time constant circuit, the input clock pulses each having a trapezoidal waveform are inputted to the non-inverting terminal of the driver 6. A threshold voltage Vth is inputted to the inverting terminal of the driver 6. This threshold voltage Vth is adjusted such that each duty factor DF of the positive and negative clock pulses V3 and V4 outputted from the receiver 12 in the receiving unit 2 becomes the standard value 50%.

Next, the operation of the driver 6, when the clock pulses V2 each having a trapezoidal waveform are supplied to the non-inverting input terminal of the driver 6 and the threshold voltage Vth is supplied to the inverting terminal of the driver 6, will be explained.

Figure 4:
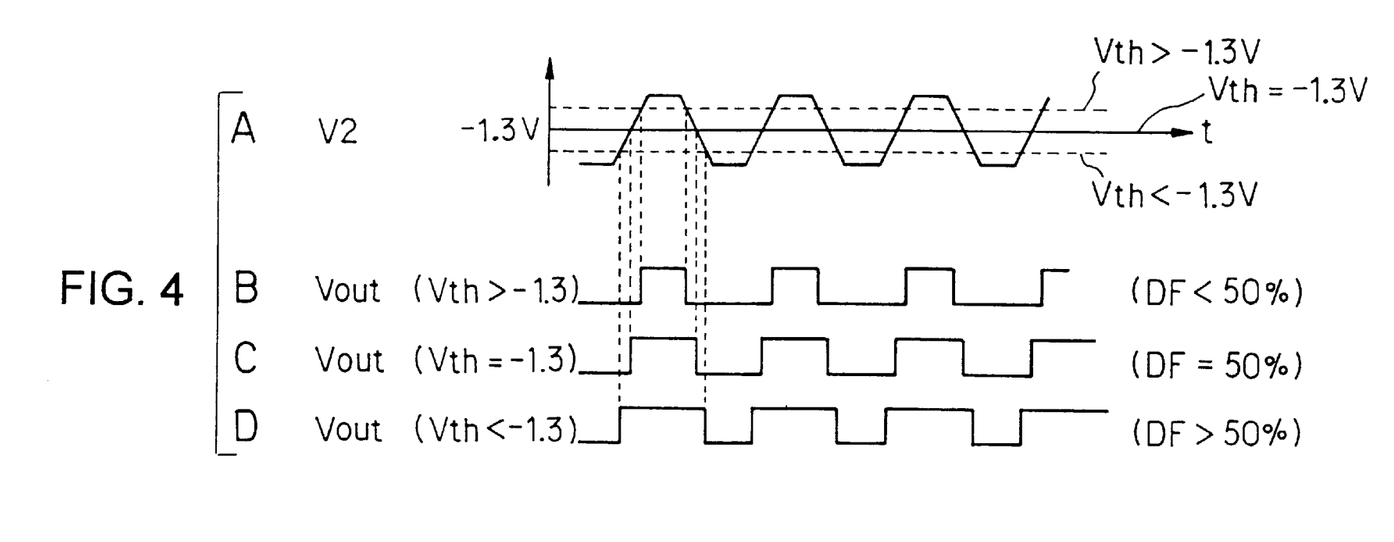
FIG. 4 is a waveform diagram for explaining the states that the duty factor of the output waveform Vout of the driver is changed by changing a threshold value Vth applied to the driver in the transmitting unit of the clock pulse transmitting circuit shown in FIG. 1.

Assuming that the waveform V2 of the trapezoidal clock pulses supplied to the non-inverting input terminal of the driver 6 changes up and down with an equal amplitude, as shown in FIG. 4A, from −1.3V as a central value and the duty factor DF is 50%, when the threshold voltage Vth supplied to the inverting terminal of the driver 6 is larger than −1.3V (Vth>−1.3V), the duty factor DF of the output waveform Vout of the driver 6 becomes, as shown in FIG. 4B, smaller than 50% (DF<50%). Further, when the threshold voltage Vth is equal to −1.3V (Vth=1.3V), the duty factor DF of the output waveform Vout of the driver 6 becomes, as shown in FIG. 4C, equal to 50% (DF=50%). Furthermore, when the threshold voltage is smaller than −1.3V (Vth<−1.3V), the duty factor DF of the output waveform Vout of the driver 6 becomes, as shown in FIG. 4D, larger than 50% (DF>50%).

From the waveforms shown in FIG. 4 and the above explanation, it can be seen that if the threshold voltage Vth supplied to the inverting terminal of the driver 6 becomes larger, then the duty factor DF of the output waveform becomes, on the contrary, smaller, and if the threshold voltage Vth becomes smaller, the duty factor DF of the output waveform of the driver o becomes, on the contrary, larger. That is, it can be seen that the duty factor DF of the output waveform of the driver 6 can be controlled to a proper value by changing the magnitude of the threshold voltage vth.

In the first embodiment shown in FIG. 1, the positive clock pulses V3 and the negative clock pulses V4 outputted from the receiver 12 are supplied to the RC integrator circuits 21 and 22, respectively to detect their respective direct current levels (mean values) V5 and V6, and those detected direct current levels V5 and V6 are supplied, as control signals, to the second and third buffers 27 and 28 in the transmitting unit 1 through the transmission lines 25 and 26 via the fifth and sixth buffers 23 and 24, respectively. Therefore, the output signal V7 of the second buffer 27 becomes a voltage equal to or proportional to a direct current level V5 of the positive clock pulses V3 outputted from the receiver 12, and the output signal V8 of the third buffer 28 becomes a voltage equal to or proportional to a direct current level V6 of the negative clock pulses V4 outputted from the receiver 12. Here, in order to simplify the explanation, the gain of each of the fifth and sixth buffers 23 and 24 in the receiving unit 2 is set to 1, and the gain of each of the second and third buffers 27 and 28 in the transmitting unit 1 is set to 1. It is assumed that the output signal V7 of the second buffer 27 is equal to the direct current level V5 of the positive clock pulses V3 outputted from the receiver 12, and the output signal V8 of the third buffer 28 is equal to the direct current level V6 of the negative clock pulses V4 outputted from the receiver 12.

The output voltage V9 of the differential amplifier 30 to which the output signals V7 and V8 of these buffers 27 and 28 is, as mentioned above, represented by the following formula.

$$V9=(R2/R1)(V8-V7) \quad (4)$$

Therefore, when each duty factor DF of the positive clock pulses V3 and the negative clock pulses V4 outputted from the receiver 12 is smaller than 50%, since the relationship between the output voltages V7 and V8, i.e., the direct current levels of the clock pulses V3 and V4, of the second and third buffers 27 and 28 becomes, as explained with reference to FIG. 2A, V8>V7, then V9 is V9>0 from the above formula (4). Further, when each duty factor DF of the positive clock pulses V3 and the negative clock pulses V4 is equal to 50%, since the relationship between the output voltages V7 and V8, i.e., the direct current levels of the clock pulses V3 and V4, of the second and third buffers 27 and 28 becomes, as explained with reference to FIG. 2B, V7=V8, then V9 is V9=0 from the above formula (4). Furthermore, when each duty factor DF of the positive and negative clock pulses V3 and V4 is larger than 50%, since the relationship between the output voltages V7 and V8, i.e., the direct current levels of the clock pulses V3 and V4, of the second and third buffers 27 and 28 becomes, as explained with reference to FIG. 2C, V8<V7, then V9 is V9<0 from the above formula (4).

The output voltage V9 of the differential amplifier 30 is inputted to the integrator 36. The output voltage V10 of the integrator 36 can be obtained, if the capacitance value of the capacitor 37 is C and the resistance value of the resistor 38 is R, by a following formula, as is well known in this technical field.

$$V10=(-1/RC) \int V9 dt \quad (5)$$

Figure 3:
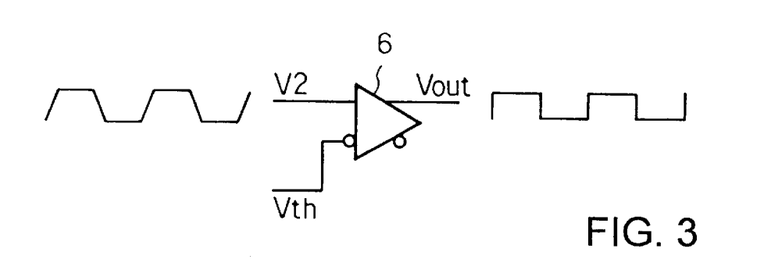
FIG. 3 is a waveform diagram showing respective examples of an input waveform V2 and an output waveform Vout of a driver of a transmitting unit in the clock pulse transmission circuit shown in FIG. 1.

The output voltage V10, of the integrator 36 is supplied to the inverting input terminal of the driver 6 via the fourth buffer 40, as already mentioned with reference to FIG. 3, as a threshold voltage Vth.

FIGS. 5A–5F show, when each duty factor DF of the positive and negative clock pulses outputted from the receiver 12 is changed from DF<50% to DF=50% (FIGS. 5A and 5B), a state that the integrated outputs (direct current levels) V5 and V6 and (therefore, the output voltages V7 and V8 of the second and third buffers 27 and 28) of the first and second integrator circuits 21 and 22 are changed (FIGS. 5C and 5D), a state of the output voltage of the differential amplifier 30 is changed (FIG. 5E), and a state of the output voltage V10 of the integrator 36 (therefore, the threshold voltage Vth) is changed (FIG. 5F), respectively. Further, FIGS. 6A–6F show, when each duty factor DF of the positive and negative clock pulses V3 and V4 outputted from the receiver 12 changes from DF>50% to DF=50% (FIGS. 6A and 6B), a state of the integrated outputs (direct current levels) V5 and V6 and (therefore, the output voltages V7 and V8 of the buffers 27 and 28) of the integrator circuits 21 and 22 are changed (FIGS. 6C and 6D), a state of the output voltage of the differential amplifier 30 is changed (FIG. 6E), and a state of the output voltage V10 of the integrator 36 and (therefore, the threshold voltage Vth) is changed (FIG. 6F), respectively.

Figure 5:
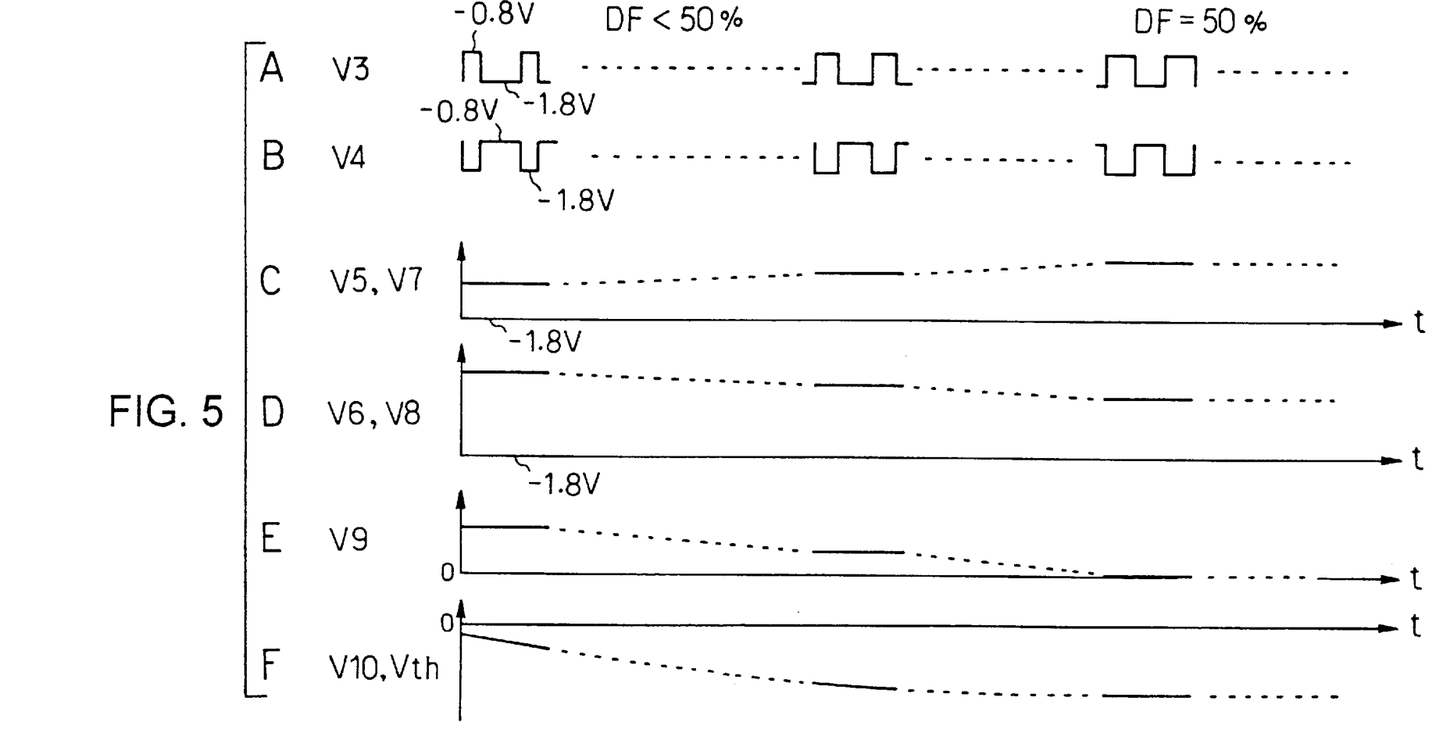
FIG. 5 is a waveform diagram showing waveforms at essential portions for explaining an example of the operation of the clock pulse transmission circuit shown in FIG. 1.
Figure 6:
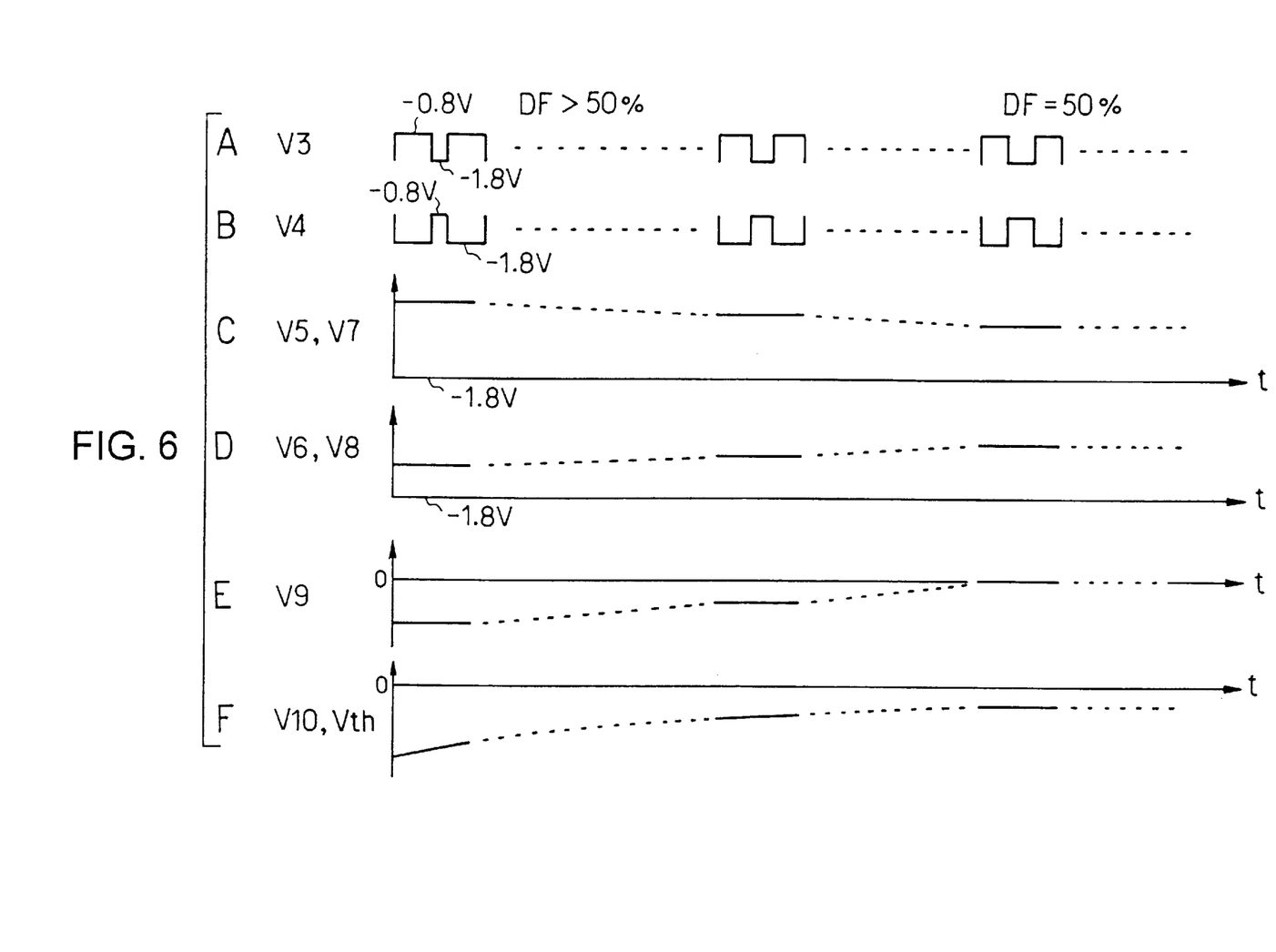
FIG. 6 is a waveform diagram showing waveforms at essential portions for explaining another example of the operation of the clock pulse transmission circuit shown in FIG. 1.

That is, when each waveform V2 of the trapezoidal clock pulses supplied to the non-inverting input terminal of the driver 6 changes up and down with an equal amplitude from −1.3V as a central voltage as shown in FIG. 4A and the duty factor of the clock pulses is 50%, if each duty factor DF of the positive and negative clock pulses V3 and V4 outputted from the receiver 12 is smaller than the standard value 50% (DF<50%), the threshold value Vth gradually decreases as shown in FIG. 5F. Therefore, as already mentioned with reference to FIG. 4, the duty factor DF of the output voltage of the driver 6 gradually increases up to 50% and then gets into a balanced state. As a result, since V7, V8 and V9 become V7=V8 and V9=0, the threshold value Vth becomes −1.3V. Thus, the duty factor DF of the output voltage Vout of the driver 6 is maintained to 50% and the output voltage Vout changes up and down with an equal amplitude (0.5V) from −1.3V as a central voltage to have a constant range from −1.8V to −0.8V.

Further, if each duty factor DF of the clock pulses V3 and V4 outputted from the receiver 12 is larger than the standard value 50%, the threshold value Vth gradually increases as shown in FIG. 6F. Therefore, the duty factor DF of the output voltage of the driver 6 gradually decreases up to 50% and then gets into a balanced state. As a result, since V7, V8 and V9 become V7=V8 and V9=0, the threshold value Vth becomes −1.3V. Thus, the duty factor DF of the output voltage Vout of the driver 6 is maintained to 50% and the output voltage Vout changes up and down with an equal amplitude (0.5V) from −1.3V as a central voltage to have a constant range from −1.8V to −0.8V.

In such a way, since the duty factor of the clock pulses supplied to the non-inverting input terminal of the driver 6 (therefore, the duty factor of the output voltage Vout of the driver 6) can be changed by changing the threshold voltage Vth applied to the inverting input terminal of the driver 6, even if the duty factor of the clock pulses (V1) supplied to the transmitting unit 1 has already been changed, each duty factor of the positive and negative clock pulses outputted from the receiver 12 can be controlled to be the standard value 50%.

Further, when the duty factor of the clock pulses supplied to the non-inverting input terminal of the driver 6 is set to a set value other than the standard value 50%, the threshold voltage Vth applied to the inverting input terminal of the driver 6 is set to a voltage value corresponding to the set value of the duty factor. In this case, since the output voltage V9 of the differential amplifier 30 is a predetermined voltage value other than 0V, the threshold value Vth is a predetermined voltage value other than −1.3V.

Figure 7:
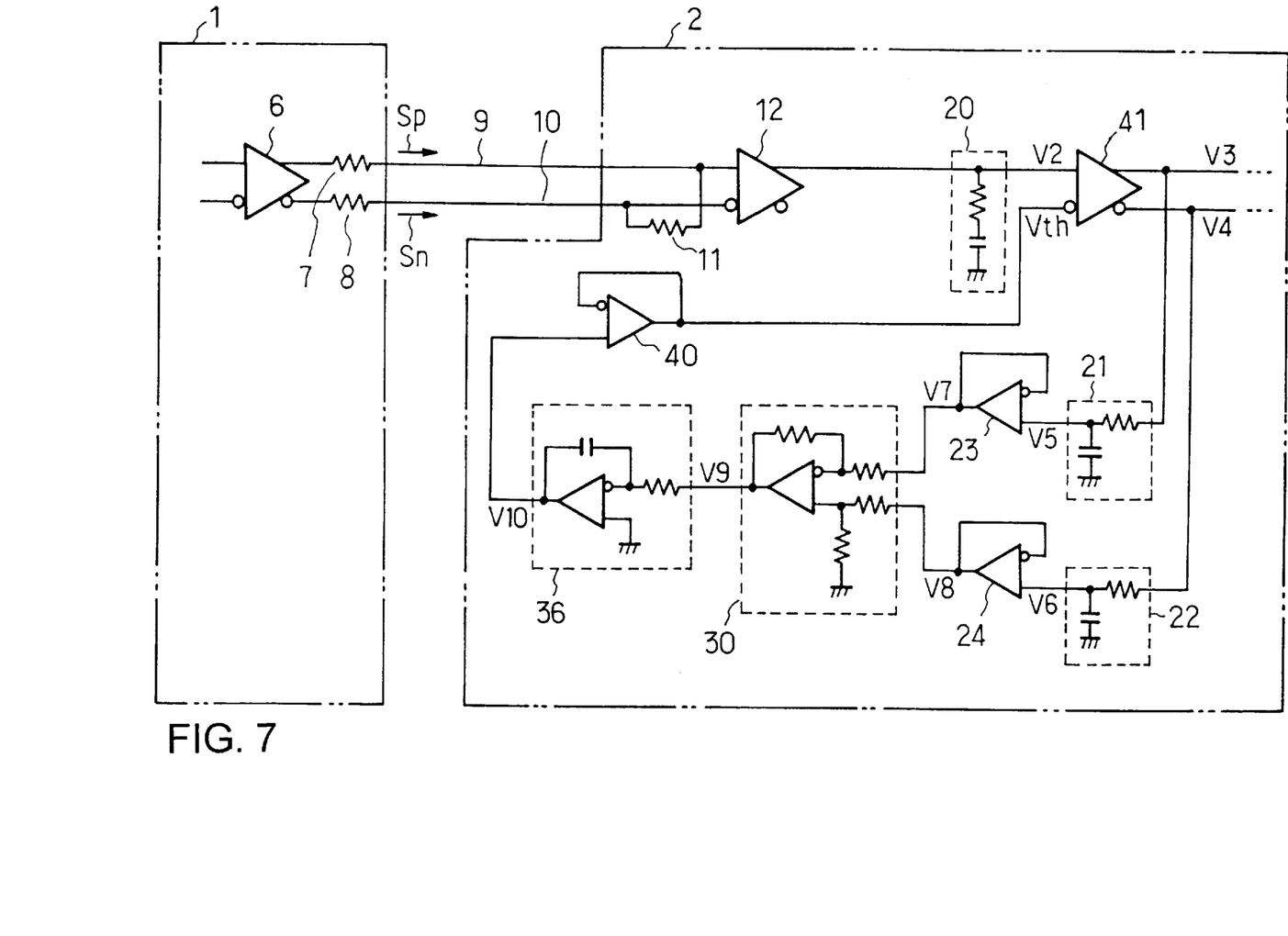
FIG. 7 is a circuit connection diagram showing a second embodiment of the clock pulse transmission circuit according to the present invention.

FIG. 7 is a circuit connect on diagram showing a second embodiment of the clock pulse transmission circuit according to the present invention. In this second embodiment, the clock pulse transmission circuit is constructed such that the time constant circuit 20, the differential amplifier 30, the integrator 36 and the fourth buffer 40 in the transmitting unit 1 are moved to the receiving unit 2 and an ECL differential buffer 41 for correcting the duty factor is provided at the output side of the receiver 12 in the receiving unit 2 to perform the correction operation of the duty factor (performed in the transmitting unit 1 in the aforementioned first embodiment) in the receiving unit 2.

An RC time constant circuit 20 having the same configuration as in the first embodiment is inserted into the output side of the receiver 12 in the receiving unit 2 to convert the positive or negative clock pulses outputted from the receiver 12 to clock pulses each having trapezoidal waveform and the trapezoidal clock pulses are supplied to the non-inverting input terminal of the differential buffer 41. In addition, a threshold voltage Vth is inputted to the inverting input terminal of the differential buffer 41 and the threshold voltage Vth is changed to control each duty factor DF of the positive and negative clock pulses V3 and V4 outputted from the differential buffer 41 to become the standard value 50%.

Further, since the adjustment operation of the duty factor is same as that in the above first embodiment, a further explanation will be omitted.

In such a construction, since the detection and the correction of the duty factor DF of the clock pulses transmitted to the receiving unit 2 can be performed entirely in the receiving unit 2, it is not necessary to use, as in the first embodiment, the pair of transmission lines 25 and 26 for transmitting the control signals. As a result, since the second and third buffers 27 and 28 are not necessary either, there is an advantage that the circuit configuration can be simplified and the cost can be reduced.

As apparent from the above explanations, in the present invention, the clock pulse transmission circuit is constructed such that a duty factor error of clock pulses received by the receiving unit is detected as a difference between the direct current levels (mean values) of the positive and negative clock pulses and the difference between the direct current levels is integrated to be supplied to the driver or the differential buffer as a threshold voltage so that the duty factor of the clock pulses outputted from the driver or the differential buffer can automatically be corrected. Therefore, there is an advantage that the correction of a duty factor error can be performed very simply.

In addition, in the present invention, since a duty factor error of clock pulses can automatically be corrected, the problem that an amount of delay for setting a duty factor of clock pulses is changed, as in the variable delay circuit in the prior art, by an aged deterioration does not occur. Therefore, there is an advantage that a manual re-adjustment of a circuit such as a re-adjustment of an amount of delay is not necessary at all.

What is claimed is:

1. A clock pulse transmission circuit including a transmitting unit for outputting a first pair of positive and negative clock pulses to transmit them, a receiving unit for receiving said first pair of positive and negative clock pulses transmitted from said transmitting unit and outputting a second pair of positive and negative clock pulses, and signal transmission paths for connecting between said transmitting unit and said receiving unit, and wherein said receiving unit comprises:

receiver means for outputting the second pair of positive and negative clock pulses in response to clock pulses transmitted from said transmitting unit through said signal transmission paths and supplied to input terminals of said receiver means;

first and second filter means for taking out direct current (DC) components of the second pair of positive and negative clock pulses outputted from said receiver means, respectively; and a first buffer circuit and a second buffer circuit for transmitting respective output signals of said first and second filter means to said transmitting unit through a pair of control signal transmission paths;

and wherein said transmitting unit comprises:

a time constant circuit for outputting a clock signal having sloping leading edges and sloping trailing edges;

a driver for comparing the output clock signal of said time constant circuit with a threshold voltage, outputting the first pair of positive and negative clock pulses corresponding to a difference between the output clock signal of said time constant circuit and the threshold voltage, and transmitting the first pair of positive and negative clock pulses to said receiving unit;

differential amplifier means for finding a difference between output signals respectively transmitted from said first and second buffer circuits in said receiving unit to detect an error in duty factory of said second pair of positive and negative clock pulses outputted from said receiver means in said receiving unit; and integrator means for integrating an output signal of said differential amplifier means to supply an integrated value to said driver as the threshold voltage.

2. The clock pulse transmission circuit according to claim 1, wherein said driver in said transmitting unit is constituted by a differential buffer which generates said first pair of positive and negative clock pulses in response to the output clock signal of said time constant circuit supplied to one input terminal thereof and the threshold voltage of said integrator means supplied to the other input terminal thereof;

said receiver means in said receiving unit is also constituted by a differential buffer which outputs said second pair of positive and negative clock pulses in response to the first pair of positive and negative clock pulses transmitted from said driver in said transmitting unit supplied to two input terminals thereof, respectively; and said first and second filter means in said receiving unit are a first integrator circuit and a second integrator circuit respectively for integrating the positive and negative clock pulses of the second pair to detect mean voltage values of their respective direct current components.

3. The clock pulse transmission circuit according to claim 1, wherein a third buffer circuit and a fourth buffer circuit are inserted respectively between the two input terminals of said differential amplifier means in said transmitting unit and said pair of control signal transmission paths.

4. The clock pulse transmission circuit according to claim 1, wherein another buffer circuit is inserted between said integrator means and said driver in said transmitting unit.

5. The clock pulse transmission circuit according to claim 1, wherein said driver in said transmitting unit and said receiver means in said receiving unit are each constituted by a respective differential buffer using an emitter-coupled logic.

6. A clock pulse transmission circuit including a transmitting unit for outputting a first pair of positive and negative clock pulses to transmit them, a receiving unit for receiving said first pair of positive and negative clock pulses transmitted from said transmitting unit and outputting a second pair of positive and negative clock pulses, and signal transmission paths for connecting between said transmitting unit and said receiving unit, and wherein said receiving unit comprises:

receiver means for outputting clock pulses in response to the first pair of positive and negative clock pulses transmitted from said transmitting unit through said signal transmission paths and supplied to input terminals of said receiver means;

a time constant circuit for giving a slope to the leading edge and the trailing edge of each of the clock pulses outputted from said receiver means to supply an output clock signal;

a differential buffer for comparing the output clock signal of said time constant circuit with a threshold voltage to output the second pair of positive and negative clock pulses corresponding to a difference between the output clock signal and the threshold voltage;

first and second filter means for taking out direct current (DC) components of said second pair of positive and negative clock pulses outputted from said differential buffer, respectively;

differential amplifier means for finding a difference between the signals respectively outputted from said first and second filter means to detect an error in duty factor of said second pair of positive and negative clock pulses outputted from said differential buffer; and integrator means for integrating an output signal of said differential amplifier means to supply an integrated value to said differential buffer as the threshold voltage;

and wherein said transmitting unit comprises:

a driver for outputting the first pair of positive and negative clock pulses in response to clock pulses supplied to its input terminal.

7. The clock pulse transmission circuit according to claim 6, wherein a first buffer circuit and a second buffer circuit are inserted respectively between said first and second filter means and the two input terminals of said differential amplifier means in said receiving unit.

8. The clock pulse transmission circuit according to claim 6, wherein a buffer circuit is inserted between said integrator means and said differential buffer in said receiving unit.

9. The clock pulse transmission circuit according to claim 6, wherein said driver in said transmitting unit, and said receiver means and said differential buffer in said receiving unit are each constituted by a respective differential buffer using an emitter-coupled logic.

* * * * *